(12) United States Patent
Ridenour, II

(10) Patent No.: US 9,842,506 B2
(45) Date of Patent: Dec. 12, 2017

(54) SYSTEMS AND METHODS FOR CONFLICT DETECTION USING DYNAMIC THRESHOLDS

(75) Inventor: Richard D. Ridenour, II, Glendale, AZ (US)

(73) Assignee: Aviation Communication & Surveillance Systems LLC, Phoenix, AZ (US)

( * ) Notice: Subject to any disclaimer, the term of this patent is extended or adjusted under 35 U.S.C. 154(b) by 1099 days.

(21) Appl. No.: 13/095,801

(22) Filed: Apr. 27, 2011

(65) Prior Publication Data

US 2011/0231096 A1    Sep. 22, 2011

Related U.S. Application Data

(63) Continuation-in-part of application No. 12/535,208, filed on Aug. 4, 2009.

(Continued)

(51) Int. Cl.

| G06F 17/10 | (2006.01) |
|---|---|
| G06G 7/78 | (2006.01) |
| G06G 1/16 | (2006.01) |
| G06F 19/00 | (2011.01) |
| G06F 7/70 | (2006.01) |
| G06F 7/76 | (2006.01) |
| G08G 5/06 | (2006.01) |
| G08G 5/00 | (2006.01) |
| G08G 5/04 | (2006.01) |
| G01S 13/78 | (2006.01) |

(52) U.S. Cl.
CPC ........... *G08G 5/065* (2013.01); *G08G 5/0008* (2013.01); *G08G 5/045* (2013.01); *G08G 5/06* (2013.01); *G01S 13/781* (2013.01)

(58) Field of Classification Search
USPC .................................................. 701/301, 120
See application file for complete search history.

(56) References Cited

U.S. PATENT DOCUMENTS

| 2002/0154061 A1 | 10/2002 | Frazier |
| 2003/0078754 A1* | 4/2003 | Hamza .......................... 702/150 |

(Continued)

OTHER PUBLICATIONS

Notification of Transmittal of the International Search Report and the Written Opinion of the International Searching Authority, or Declaration issued by the European Patent Office dated Jul. 18, 2011.

*Primary Examiner* — Imran Mustafa
(74) *Attorney, Agent, or Firm* — Squire Patton Boggs

(57) ABSTRACT

Systems and methods are delineated in which dynamic thresholds may be employed to detect and provide alerts for potential conflicts between a vehicle and another vehicle, an object or a person in an aircraft environment. Current systems for airport conflict detection and alerting consider one or more alerting boundaries which are independent of the amount of traffic present at any one time or over the course of time. Because nuisance alerts rates depend to a large extent on the amount of traffic, and because alert detection thresholds are often set based on a desire to limit nuisance alerts to a specific threshold, adapting those thresholds based on, among other things, the amount of traffic can result in earlier alerting in some crash scenarios and can even result in providing an alert in a crash scenario where no alert would have otherwise been generated.

20 Claims, 18 Drawing Sheets

Related U.S. Application Data

(60) Provisional application No. 61/166,172, filed on Apr. 2, 2009, provisional application No. 61/086,043, filed on Aug. 4, 2008, provisional application No. 61/328,538, filed on Apr. 27, 2010.

(56) References Cited

U.S. PATENT DOCUMENTS

| | | | |
|---|---|---|---|
| 2003/0122701 A1 | 11/2003 | Tran | |
| 2004/0189492 A1* | 9/2004 | Selk, II | G01C 23/00 340/973 |
| 2006/0041381 A1 | 2/2006 | Simon | |
| 2007/0078592 A1 | 4/2007 | Meunier | |
| 2008/0195301 A1* | 8/2008 | Fabre | G08G 5/065 701/120 |
| 2008/0249669 A1 | 10/2008 | Skarman | |
| 2010/0052973 A1* | 3/2010 | Fabre | G08G 5/06 342/30 |
| 2010/0070180 A1 | 3/2010 | Ridenour | |
| 2010/0191450 A1* | 7/2010 | Ravenscroft | G08G 5/065 701/120 |

* cited by examiner

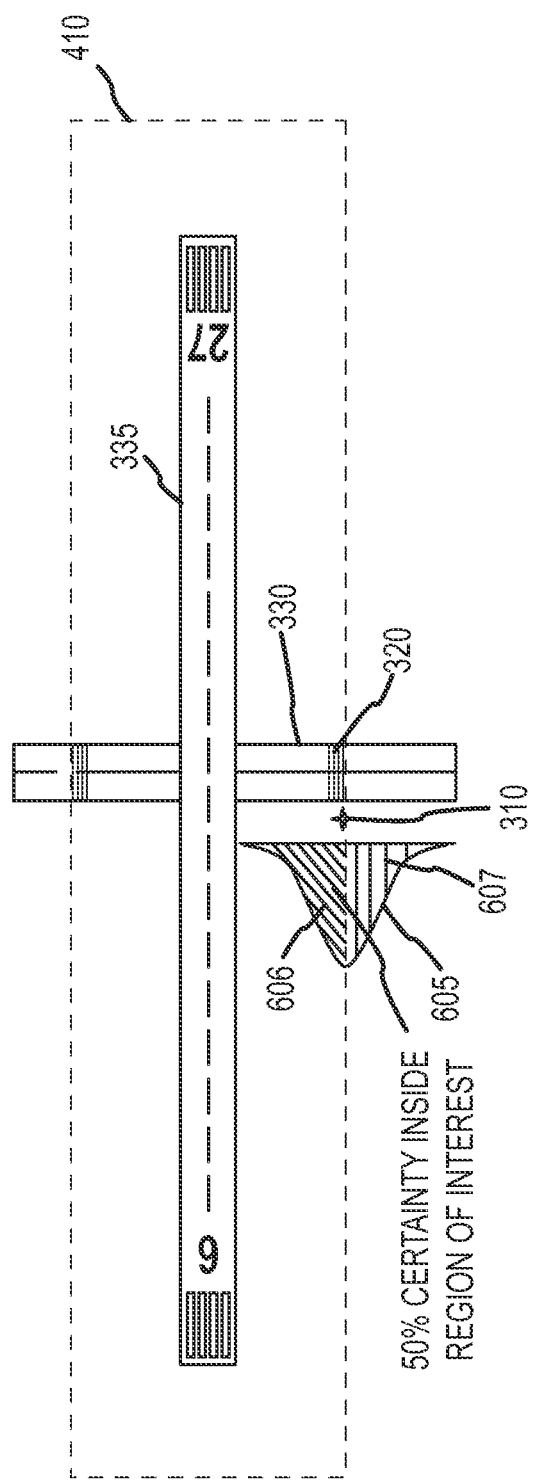

SYSTEMS AND METHODS FOR CONFLICT DETECTION USING DYNAMIC THRESHOLDS

CROSS-REFERENCE TO RELATED APPLICATION

This application is (1) related and claims priority to application No. 61/328,538, filed in the name of Richard D. Ridenour on Apr. 27, 2010 and entitled "SYSTEMS AND METHODS FOR CONFLICT DETECTION USING DYNAMIC THRESHOLDS" and (2) related and claims priority to and is a continuation-in-part of application Ser. No. 12/535,208, filed in the name of Richard D. Ridenour on Aug. 4, 2009 and entitled "SYSTEMS AND METHODS FOR CONFLICT DETECTION USING POSITION UNCERTAINTY" which is related and claims priority to Application No. 61/166,172, filed in the name Richard D. Ridenour on Apr. 2, 2009 and entitled "SYSTEMS AND METHODS FOR OPERATIONAL PERFORMANCE ASSESSMENT FOR ENHANCED SITUATIONAL AWARENESS" and Application No. 61/086,043, filed in the names of Charles Manberg, James Troxel and Richard D. Ridenour on Aug. 4, 2008 and entitled "SYSTEMS AND METHODS FOR CONFLICT DETECTION USING POSITION UNCERTAINTY," each of the foregoing hereby being incorporated herein by reference for all purposes to the extent not inconsistent with the present application.

DESCRIPTION OF THE INVENTION

Field of the Invention

The present invention relates to systems and methods for conflict detection, and in particular, to systems and methods for conflict detection using dynamic thresholds.

Background of the Invention

The current high volume of air vehicle traffic at airports around the world creates the potential for collisions between a multitude of aircraft taking off from, or landing on, a runway. Determining the occupancy and usage of a runway to prevent aircraft-to-aircraft or aircraft-to-other-vehicle high-speed collision is often difficult. Similar issues exist in other situations where multiple vehicles, whether travelling by land, sea, or air, operate in the same areas and/or travel along the same routes.

Some aircraft are equipped with Automatic Dependent Surveillance Broadcast (ADS-B) systems that automatically and repeatedly broadcast the aircraft's position, velocity, flight identification, and other parameters. Aircraft with ADS-B systems are generally equipped with Global Positioning Systems (GPS) to allow the aircraft to determine and broadcast its position accurately. The United States Federal Aviation Administration (FAA) has proposed that ADS-B systems must be included on all aircraft by 2020 to, among other things, allow the position and movement of aircraft to be tracked in order to help avoid collisions at an airport or other location.

Historically, the accuracy of aircraft navigation systems have improved over time, but the amount of error between the aircraft's actual position and the position reported by an aircraft navigation system can be significant in a variety of situations, such as in a comparison between actual and reported separation between an aircraft on a runway and an aircraft behind a hold short line. There is always some measure of error between what the GPS, Flight Management System (FMS), or other navigation sensor calculates and the true position of a vehicle. Due to this error, the reported position of a vehicle could be on a runway even though the vehicle is, in fact, stopped safely short of the hold short line and not on the runway.

Conventional conflict detection systems may not account for position inaccuracies that are inherent to aircraft positioning systems providing a reported position of an aircraft. Additionally, positioning systems, and their associated level of error/uncertainty, vary from aircraft to aircraft. Often, the magnitude of these position uncertainties are significant with respect to typical distances between "safe" and "unsafe" conditions on an airport surface. This uncertainty may exist not only with own ship position, but also with the reported position of other aircraft or vehicles in the vicinity that could potentially conflict with own ship.

Conventional alerting systems issue alerts based on a reported position of an aircraft and/or a projection of an aircraft's position based on its reported velocity (i.e., they treat a reported position of an aircraft as its actual position). Unfortunately, these systems are prone to nuisance alerts. These nuisance alerts can result in pilots rejecting a takeoff (which may require abnormal braking and result in disrupted airport operation, flight delay, and potential passenger injury). Such nuisance alerts may also result in pilots rejecting a landing, which may require a go-around maneuver and result in disrupted airport operation, extra fuel consumption and flight delay. These and other issues are addressed by embodiments of the present invention.

SUMMARY OF THE INVENTION

A method according to an embodiment of the present invention comprises receiving in a host vehicle one or more reports from one or more other vehicles, the one or more reports each including a reported position for a respective one of the one or more other vehicles; for each of the one or more other vehicles, comparing a respective probability distribution that is based on information provided in a respective report to a respective representation of a line of demarcation, each respective representation of a line of demarcation dividing a respective first region from a respective second region wherein each respective first region includes a respective zone of interest; for each of the one or more other vehicles, determining from the respective probability distribution a respective probability that a respective one of the one or more other vehicles is located in a respective second region; determining whether a probability that all of the one or more vehicles are located in a respective second region is less than or equal to a predefined value; and providing an alert in the host vehicle when (1) a threat of a collision is determined to exist between the host vehicle and at least one of the one or more other vehicles; and (2) the probability that all of the one or more vehicles are located in a respective second region is less than or equal to the predefined value.

A method according to another embodiment of the present invention comprises receiving in a host vehicle one or more reports from one or more other vehicles, the one or more reports each including a reported position for a respective one of the one or more other vehicles; for each of the one or more other vehicles, comparing a respective probability distribution that is based on information provided in a respective report to a respective representation of a line of demarcation, each respective representation of a line of demarcation dividing a respective first region from a respective second region wherein each respective first region includes a respective zone of interest; for each of the one or more other vehicles, determining from the respective probability distribution a respective probability that a respective one of the one or more other vehicles is located in a respective second region; determining whether a probability that at least one of the one or more vehicles is located in a respective first region is greater than or equal to a predefined value; and providing an alert in the host vehicle when (1) a threat of a collision is determined to exist between the host vehicle and at least one of the one or more other vehicles; and (2) the probability that at least one of the one or more vehicles is located in a respective first region is greater than or equal to the predefined value.

A system according to yet another embodiment of the present invention comprises a processor; and a memory in communication with the processor and storing instructions that, when executed by the processor, cause the processor to receive in a host vehicle one or more reports from one or more other vehicles, the one or more reports each including a reported position for a respective one of the one or more other vehicles; for each of the one or more other vehicles, compare a respective probability distribution that is based on information provided in a respective report to a respective representation of a line of demarcation, each respective representation of a line of demarcation dividing a respective first region from a respective second region wherein each respective first region includes a respective zone of interest; for each of the one or more other vehicles, determine from the respective probability distribution a respective probability that a respective one of the one or more other vehicles is located in a respective second region; determine whether a probability that all of the one or more vehicles are located in a respective second region is less than or equal to a predefined value; and provide an alert in the host vehicle when (1) a threat of a collision is determined to exist between the host vehicle and at least one of the one or more other vehicles; and (2) the probability that all of the one or more vehicles are located in a respective second region is less than or equal to the predefined value.

A system according to still another embodiment of the present invention comprises a processor; and a memory in communication with the processor and storing instructions that, when executed by the processor, cause the processor to receive in a host vehicle one or more reports from one or more other vehicles, the one or more reports each including a reported position for a respective one of the one or more other vehicles; for each of the one or more other vehicles, compare a respective probability distribution that is based on information provided in a respective report to a respective representation of a line of demarcation, each respective representation of a line of demarcation dividing a respective first region from a respective second region wherein each respective first region includes a respective zone of interest; for each of the one or more other vehicles, determine from the respective probability distribution a respective probability that a respective one of the one or more other vehicles is located in a respective second region; determine whether a probability that at least one of the one or more vehicles is located in a respective first region is greater than or equal to a predefined value; and provide an alert in the host vehicle when (1) a threat of a collision is determined to exist between the host vehicle and at least one of the one or more other vehicles; and (2) the probability that at least one of the one or more vehicles is located in a respective first region is greater than or equal to the predefined value.

A method according to another embodiment of the present invention comprises receiving in a host vehicle one or more reports from one or more other vehicles, the one or more reports each including a reported position for a respective one of the one or more other vehicles, the reported position being relative to a respective representation of a line of demarcation wherein each respective representation of a line of demarcation divides a respective first region from a respective second region and each respective first region includes a respective zone of interest; determining whether a probability that all of the one or more vehicles are located in a respective second region is less than or equal to a predefined value; and providing an alert in the host vehicle when (1) a threat of a collision is determined to exist between the host vehicle and at least one of the one or more other vehicles; and (2) the probability that all of the one or more vehicles are located in a respective second region is less than or equal to the predefined value.

A method according to a further embodiment of the present invention comprises receiving in a host vehicle one or more reports from one or more other vehicles, the one or more reports each including a reported position for a respective one of the one or more other vehicles, the reported position being relative to a respective representation of a line of demarcation wherein each respective representation of a line of demarcation divides a respective first region from a respective second region and each respective first region includes a respective zone of interest; determining whether a probability that at least one of the one or more vehicles is located in a respective first region is greater than or equal to a predefined value; and providing an alert in the host vehicle when (1) a threat of a collision is determined to exist between the host vehicle and at least one of the one or more other vehicles; and (2) the probability that at least one of the one or more vehicles is located in a respective first region is greater than or equal to the predefined value.

Both the foregoing summary and the following detailed description are exemplary and explanatory only and are not restrictive of the invention.

BRIEF DESCRIPTION OF THE DRAWINGS

A more complete understanding of the present invention may be derived by referring to the detailed description and claims when considered in connection with the following illustrative figures.

FIGS. 6A-6E illustrate the probability the actual position of an aircraft is within a region of interest based on different reported positions of the aircraft in accordance with the present invention.

DESCRIPTION OF THE EMBODIMENTS

Reference will now be made in detail to the exemplary embodiments of the present invention, examples of which are illustrated in the accompanying drawings.

Exemplary System

Figure 1:
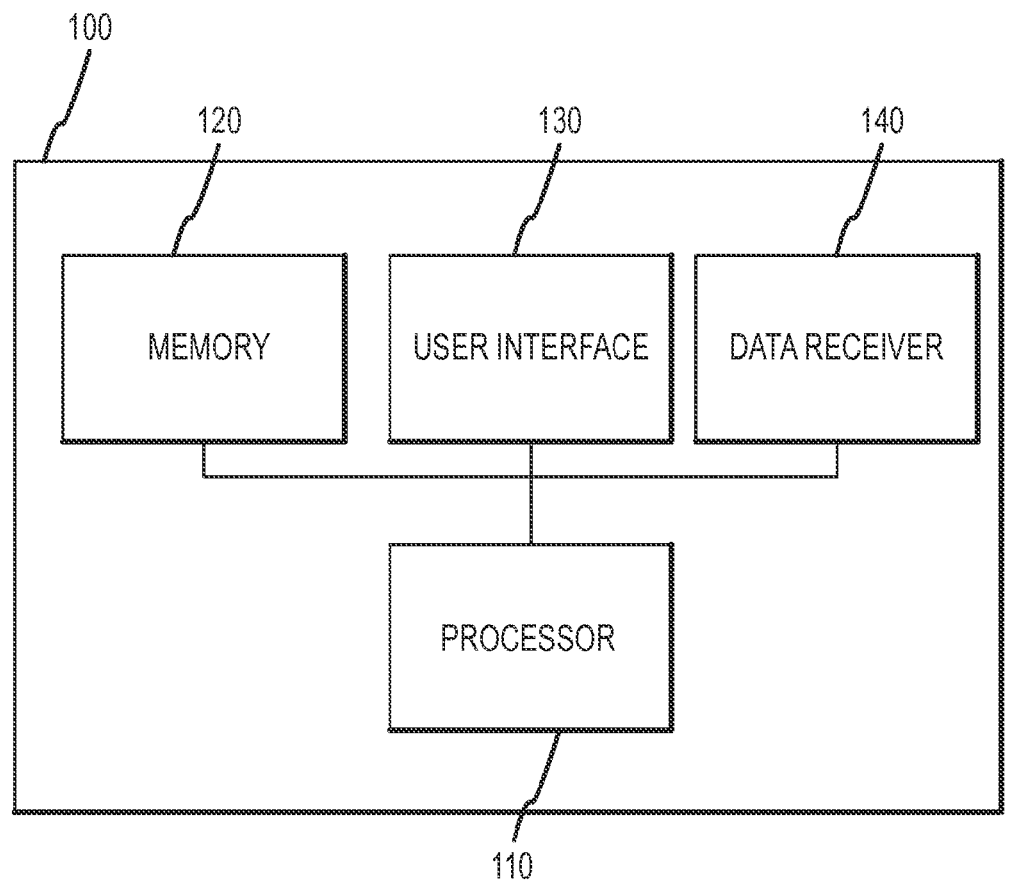
FIG. 1 is a block diagram of an exemplary system according to various aspects of the present invention.

FIG. 1 depicts an exemplary system according to various aspects of the present invention. The system 100 may include a processor 110 in communication with a memory 120, a user interface 130, and a data receiver 140. The data receiver 140 may receive data through a wired connection or through one or more antennas (not shown). The data receiver 140 may comprise a separate receiver, or be combined with a transmitter (i.e., a transceiver), and may receive electrical signals, radio frequency signals, modulated light signals, sonic signals, or other signals propagated through any suitable medium. The system 100 may operate separate and distinct from or as part of, or in conjunction with, any number of other systems and devices, such as a TCAS, an aircraft transponder, an Aircraft Surveillance Applications System (ASAS), a Cockpit Display of Traffic Information (CDTI) or any other system now or hereafter developed for use on an aircraft. The components of the exemplary system 100 may be distributed across any number of different systems and devices, and need not be physically connected to each other. The system 100 may be located on board, or external to, a vehicle for which a calculation is made as to the probability that the actual position of the vehicle is within a region of interest. The components of the system 100 may communicate with each other, as desired, as well as with any other system or device. The system 100 may additionally include (or communicate with) any other appropriate components.

The processor 110 may retrieve and execute instructions that may be stored in the memory 120 to control operation of system 100. Any number and type of processor(s), such as an integrated circuit microprocessor, microcontroller, and/or digital signal processor (DSP), can be used in conjunction with an embodiment of the present invention.

Memory 120 may store instructions, information received from one or more data sources, and any other suitable information. Memory 120, operating in conjunction with embodiments of the present invention, may include any combination of different memory storage devices, such as hard drives, random access memory (RAM), read only memory (ROM), FLASH memory, or any other type of volatile and/or nonvolatile memory. Any number of memory storage devices of any size and configuration may also be used in conjunction with embodiments of the present invention.

User interface 130 may receive input from, and provide output to, one or more users, such as an operator of a vehicle on which the system is located or an individual external to the vehicle, such as an air traffic controller. User interface 130 may include any number of suitable systems or devices to provide information and receive various inputs. User interface 130 may include one or more visual displays and/or speakers to communicate information, such as an alert, to a user. A user can provide input to user interface 130 through a mouse, a touchpad, a microphone, or any number of other input devices.

Data receiver 140 may receive data from one or more data sources, such as an ADS-B-equipped aircraft or a ground-station. The data receiver 140 may comprise any suitable receiver and may receive data using any number of frequencies and may use any communication protocol. Data receiver 140 may receive any type of information, such as a position, a velocity, or other information pertaining to a vehicle, such as an aircraft or other object.

Exemplary Method

Figure 2:
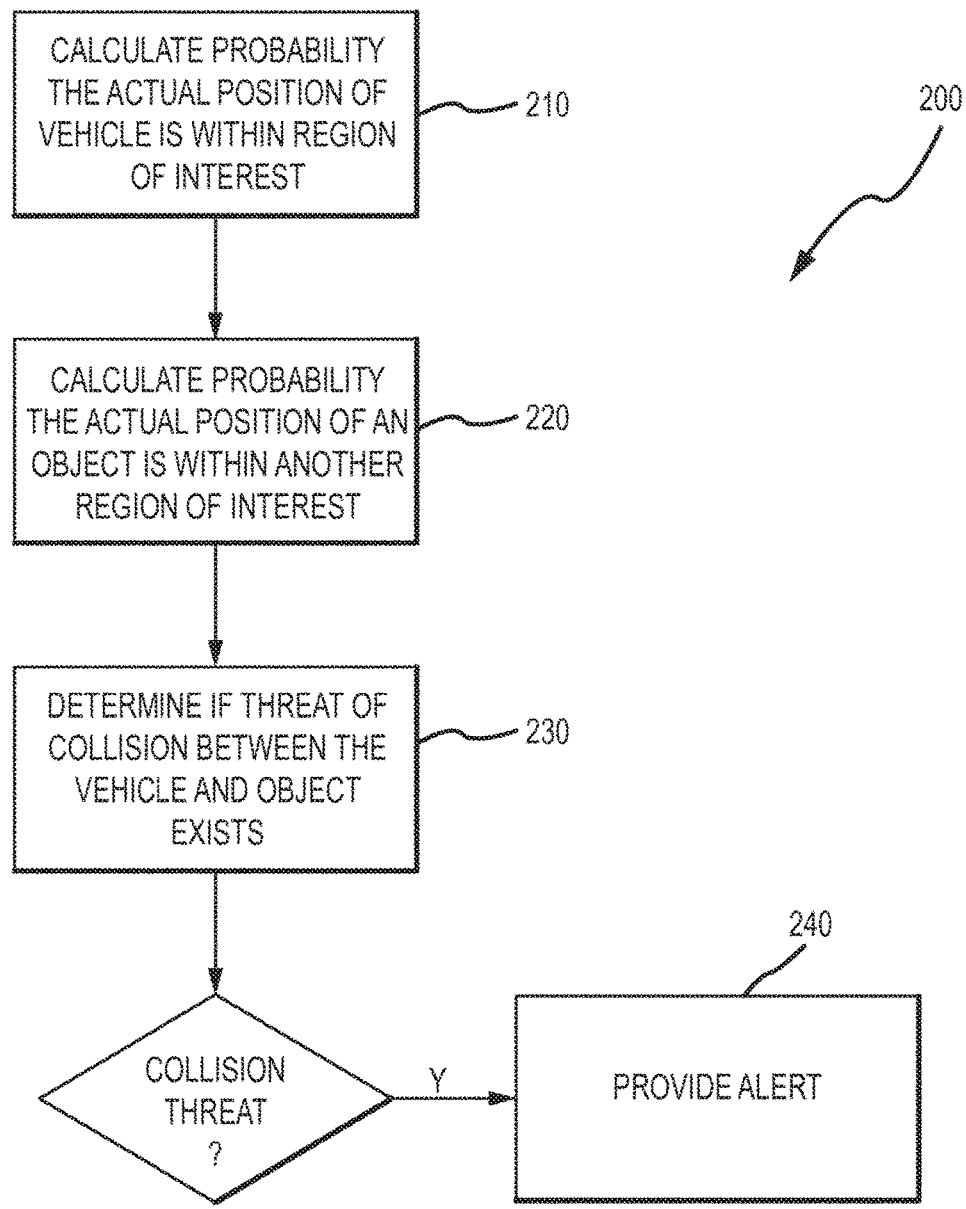
FIG. 2 is a flow diagram of an exemplary process according to various aspects of the present invention.

FIG. 2 depicts an exemplary process (200), according to various embodiments of the present invention. In this exemplary process (200), a probability that an actual position of a vehicle is within a region of interest may be calculated based on a reported position of the vehicle (210), and a probability that an actual position of an object (such as another vehicle) is within another region of interest may be calculated based on the reported position of the object (220). A determination is made as to whether a threat of collision between the vehicle and the object exists (230). If such a threat exists, an alert may be provided (240), and if no such threat exists, process 200 may repeat itself, thereby evaluating in an ongoing manner whether to provide an alert.

In the exemplary process depicted in FIG. 2, information can be requested and/or received from one or more data sources, including any system, device, vehicle, or other entity capable of providing information for use with embodiments of the present invention, including one or more systems or devices implementing embodiments of the present invention. Such information may be of any type and in any format, and may include, or be used to determine spatial information (e.g., bearing, range, position, velocity) for a vehicle, as well as for other purposes. For example, ADS-B transmissions containing a reported position and an accuracy level of the reported position may be received from a vehicle and used to determine the probability that the vehicle is within a region of interest.

Embodiments of the present invention may receive information at regular intervals and/or in response to an event, regardless of whether the information has been requested. For example, embodiments of the present invention can receive data periodically from an ADS-B-equipped system (e.g., an aircraft, ground vehicle, waterborne vehicle, or a fixed ground station). Embodiments of the present invention can receive information (such as the reported position of a vehicle) in any manner. For example, information can be provided wirelessly from a data source to a system or device (such as system 100) implementing methods in accordance with embodiments of the present invention. Such information can be provided on any frequency (or combination of frequencies), in any format, and using any communication protocol. In an exemplary embodiment of the present invention, information from an ADS-B-equipped aircraft can be provided to another ADS-B-equipped aircraft via a wireless datalink. The datalink can utilize the Mode S transponder frequency (i.e., 1090 MHz) as well, as any other frequency.

Figure 3A:
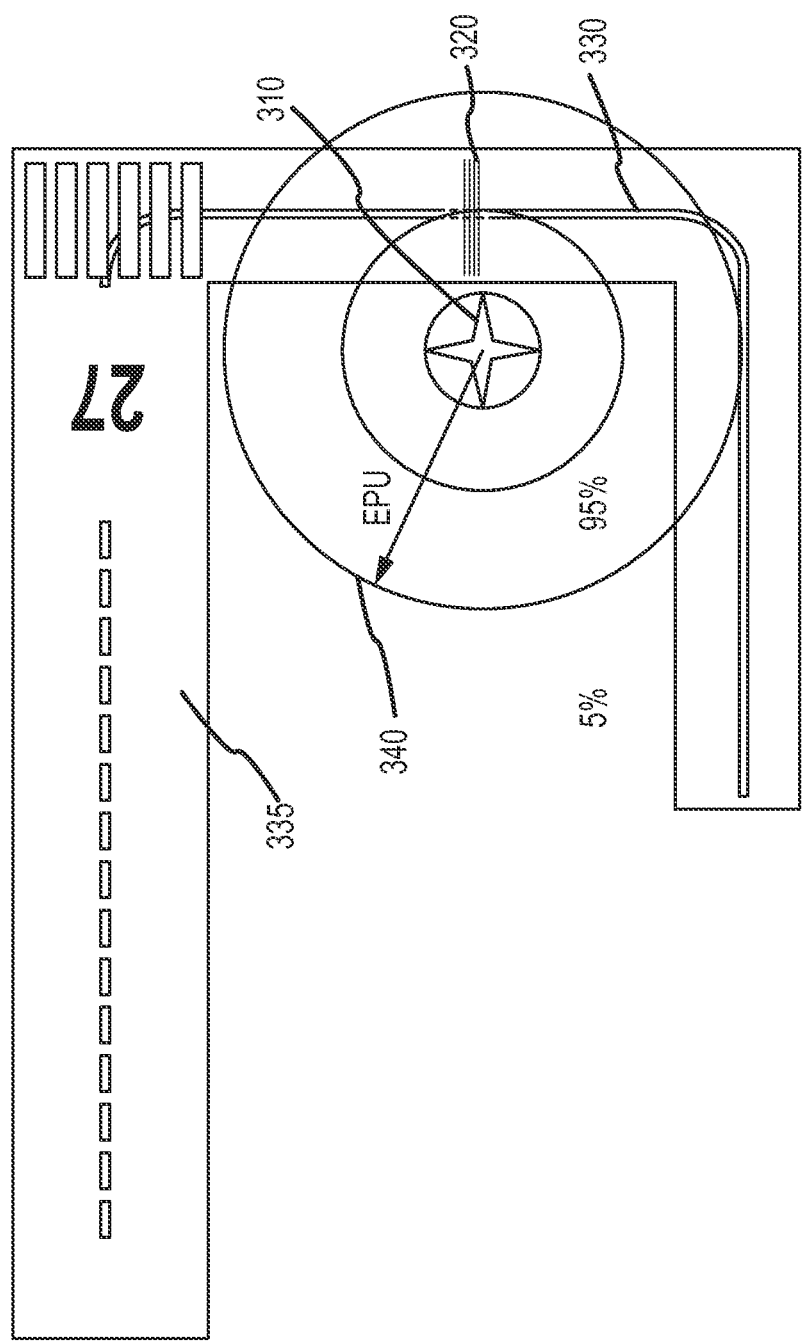
FIGS. 3A and 3B depict circular, two-dimensional distribution of positional errors around a reported position of an aircraft on a taxiway.

In accordance with embodiments of the present invention, the probability that an actual position of a vehicle is within a region of interest may be calculated based on a reported position of the vehicle. FIG. 3A illustrates a reported position of an aircraft 310 stopped near a hold short line 320 on a taxiway 330 near a runway 335. In this example, the reported position 310 may be determined by a Global Positioning System (GPS) and may be provided via an Automatic Dependent Surveillance Broadcast (ADS-B), which has an associated Navigation Accuracy Category for Position ($NAC_p$). The $NAC_p$ value defines a circle 340 around the reported position 310 with a radius (labeled "EPU" for "estimated position uncertainty"). As is the case for all $NAC_p$ values, there is at least a 95% probability that the actual position of the related vehicle is within circle 340, and no more than a 5% probability that the actual position of the related vehicle is outside circle 340. Thus, circle 340 represents a circular distribution of position errors associated with reported position 310.

Figure 3B:
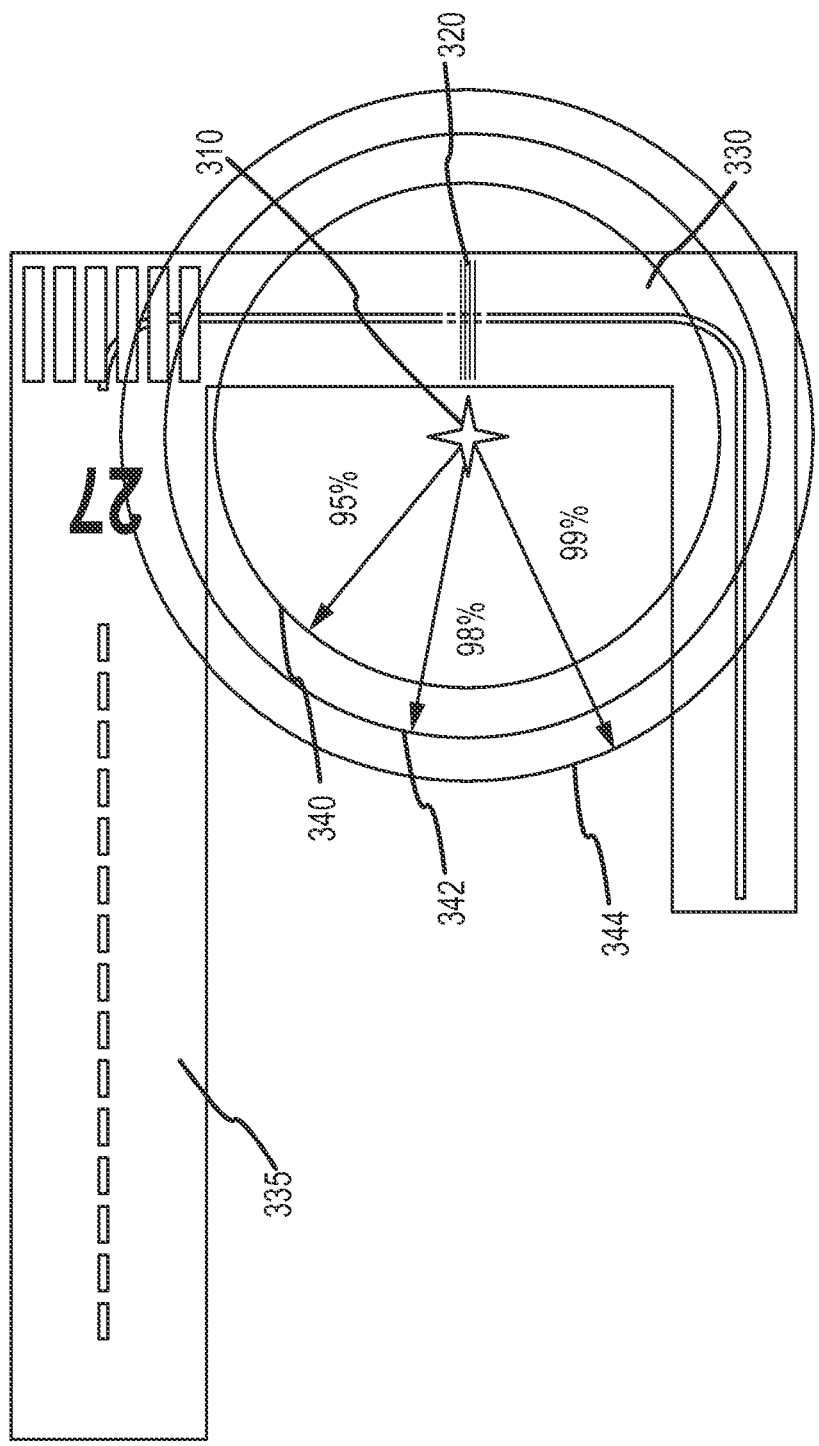

While the $NAC_p$ defines a radius of at least a 95% probability circle, circles corresponding to other levels of probability can be determined in accordance with embodiments of the present invention. According to one aspect of an embodiment of the present invention, the position errors associated with reported position 310 may be modeled as bivariate normal distributions to calculate a radii of a 98% probability circle 342 and a 99% probability circle 344, as shown in FIG. 3B.

In addition to modeling position errors, as described above (i.e., a circular distribution in two dimensions). Position errors for a reported position 310 may be modeled in one-dimensional distributions, two-dimensional distributions, and/or three-dimensional distributions in relation to a region of interest. A region of interest may be any size, shape, or configuration, and may include any number of possible past or future positions for a vehicle. For example, the region of interest may include a possible course of travel for a vehicle. The region of interest may be bounded by any number of dimensions, including a dimension measured from at least one of a distance from one or more vehicles, a surface on which a vehicle is travelling, a marking, a geographical location, a structure, and/or combinations thereof.

Figure 4:
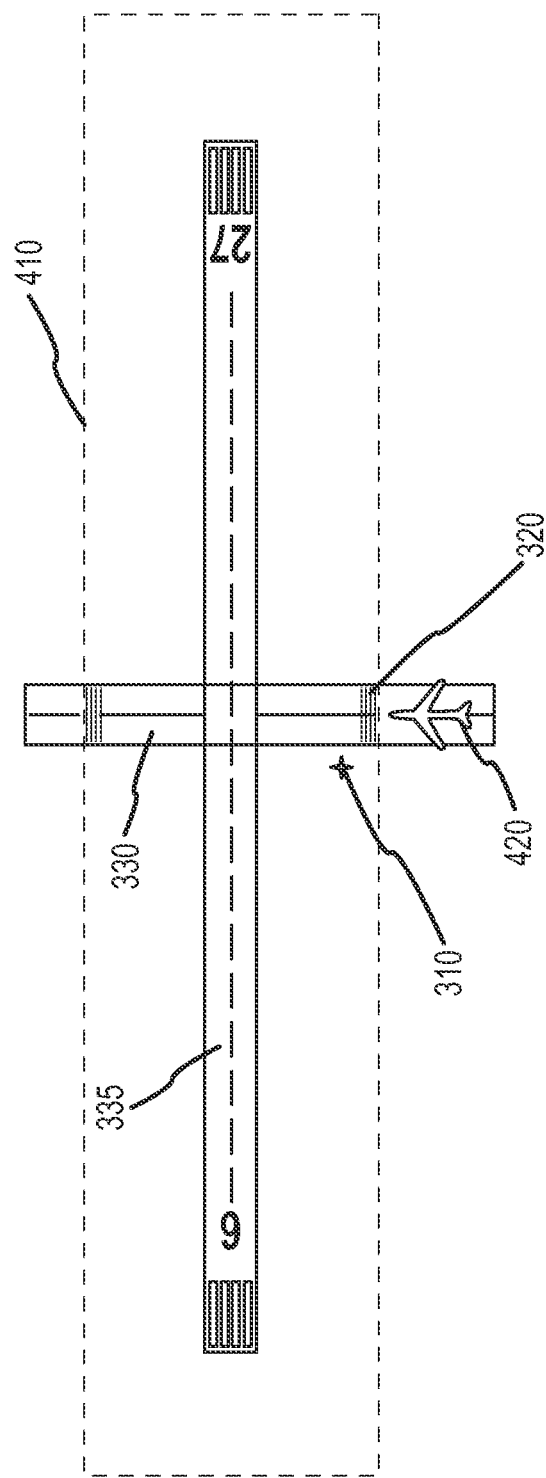
FIG. 4 illustrates a region of interest for determining the probability that an aircraft has crossed a hold line on a taxiway.

FIG. 4, for example, shows a two-dimensional, rectangular region of interest 410. In this example, an aircraft is approaching the hold short line 320 on the taxiway 330. Even though the reported position of the aircraft 310 is past the hold line 320, the actual position of the aircraft 420 is behind of the hold short line 320. This situation illustrates a shortcoming of conventional alerting systems, namely that, if a second aircraft were taking off from the runway 335, an alert would be generated based on the reported aircraft position 310 being over the hold short line 320, even though no alert is warranted. As discussed below, embodiments of the present invention help reduce such unwarranted alerts.

Figure 5A:
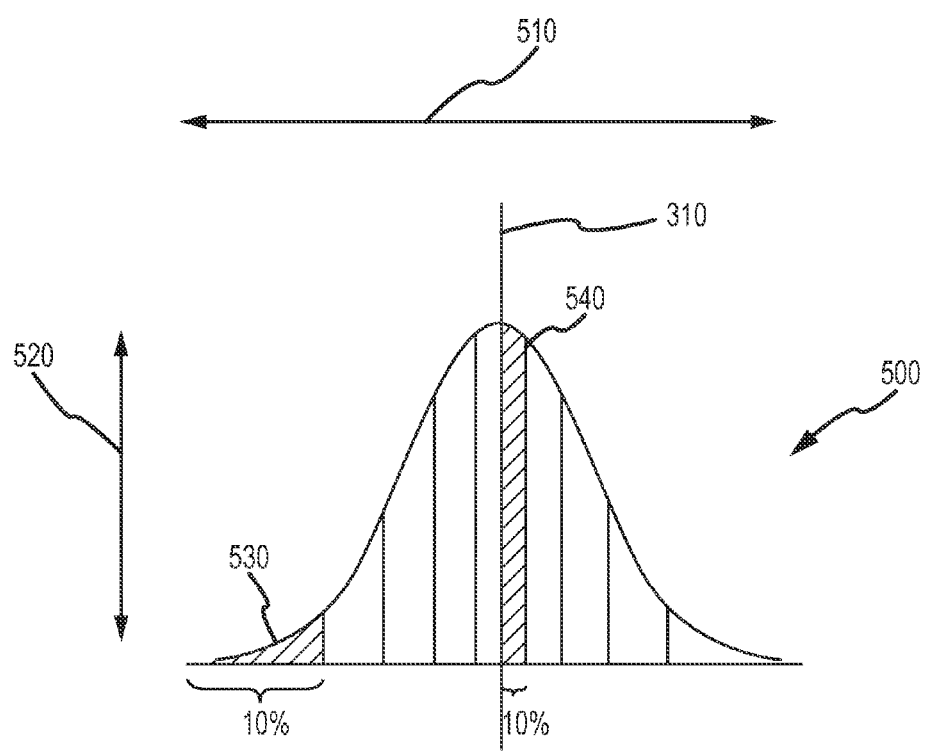
FIGS. 5A and 5B illustrate exemplary statistical probability distributions of position errors associated with the reported position of an aircraft.

FIG. 5A illustrates a typical distribution for aircraft position errors in one dimension, with the range of possible actual locations for the aircraft (510) along the horizontal axis of the curve 500 and the relative probability (520) that the reported location 310 is the actual location of the aircraft represented along the vertical axis of the curve 500. In this example, the reported aircraft position 310 is located in the center of the distribution curve 500. For each location along the curve 500, the height of the curve 500 represents the probability that the actual location is at that distance, based on the reported location 310.

In FIG. 5A, the curve 500 is symmetrical, so the probability that the actual location is left of the reported location 310 is the same as the probability that the actual location is right of the reported location 310. Additionally, the curve 500 is higher near the middle, indicating that it is more likely that the actual location is close to the reported location 310 than far from the reported location 310. A curve with the basic shape of curve 500 is referred to as a normal distribution. Error distributions in navigation systems often approximate a normal distribution, though any embodiment of the present invention may operate in conjunction with any type of statistical distribution.

The vertical lines in the curve in FIG. 5A divide the area under the curve 500 into ten segments of equal area. Each of the segments reflects a region which has a 10% chance of containing the actual location. The two shaded areas (530 and 540) each reflect a region of 10% probability. Area 540, nearer to the reported location 310, is narrower than area 530, which is farther from the reported location 310. This reflects that there is less probability of the actual location being at any one point that is far from the reported location 310 compared to closer to the reported location 310.

Figure 5B:
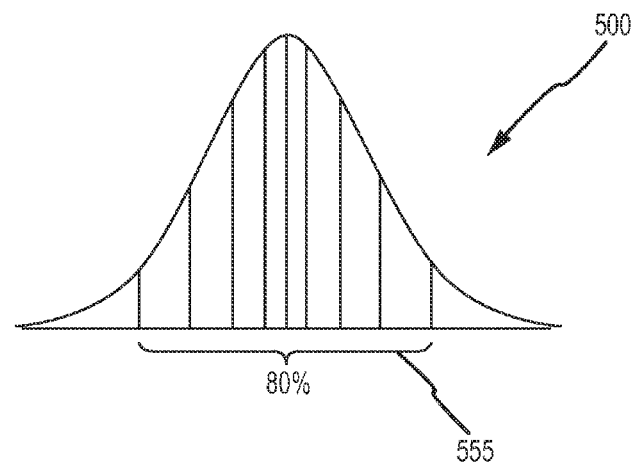
Figure 5B:
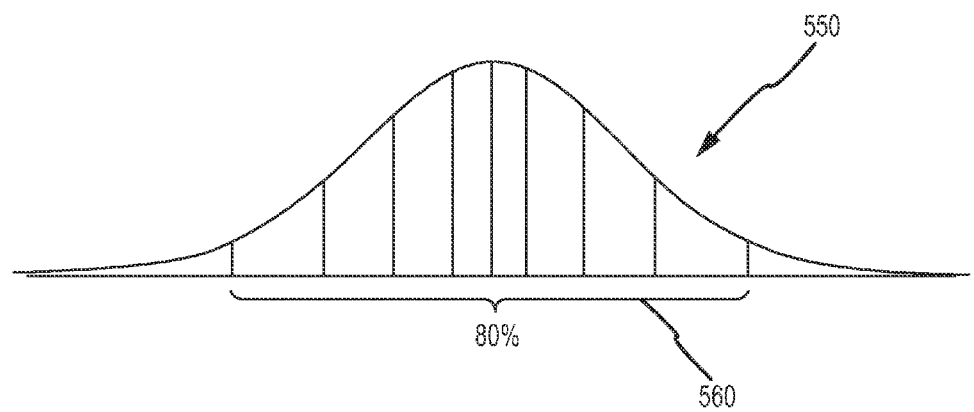

The shape of an error distribution curve for a reported location is indicative of the level of accuracy of the reported location. For example, referring to FIG. 5B, distribution curve 500 (described above in FIG. 5A) represents a reported location with relatively high accuracy, while distribution curve 550 represents a reported location with a relatively low accuracy, as compared to the distribution curve 500. As a point of comparison, the range representing the middle 80% of the curve is shown for both distributions (555 and 560). It can be seen that the higher accuracy of distribution 500 results in a smaller range 555, while distribution 550 has a larger range 560.

Embodiments of the present invention can utilize the error distribution curve for a reported position to determine, to a desired level of probability, whether the actual position of the aircraft is within a region of interest. Referring now to FIG. 6A, a reported position 310 is shown next to taxiway 330. Superimposed next to the reported position 310 is a probability distribution of position errors 605 in one dimension around the reported position of an aircraft. In this case, the reported position 310 is located directly on the lower boundary of the region of interest 410, the lower boundary corresponding to the hold short line 320. By symmetry, there is a 50% probability that the actual position of the aircraft is inside the region of interest 410 (represented by shaded portion 606 of the curve 605 and a 50% probability that the actual position is outside of the region of interest (represented by shaded portion 607 of the curve 605.

It should be noted that, while theoretically the probability distribution 605 extends to infinity in both directions (i.e., off the top and bottom of the page in FIG. 6A), practically, the probability that the actual location is more than a finite distance from the reported position 310 is essentially zero. This finite distance may vary depending on the accuracy of the navigation system. For simplicity, the distribution 605 depicted in FIG. 6A and other distributions discussed herein are depicted as having finite dimensions.

Additionally, it should be noted that, for the reported aircraft position 310, a probability distribution exists (but for simplicity is not drawn) in the left-to-right axis in FIG. 6A. Likewise, a probability distribution may also be determined in accordance with embodiments of the present invention for the altitude of the reported position 310. In the present example, if the reported aircraft location 310 is near the left or right edge of the region of interest 410 then the probability that the actual location of the aircraft is outside the region of interest 410 to the left or to the right will be non-negligible and would need to be taken into account.

In the present exemplary embodiment, where the region of interest 410 is an area around, and extending along, the runway 335, the boundaries of the region of interest based on the ends of the runway will typically be far from the reported position 310 of the vehicle in question. Thus, the probability that the actual position of the vehicle is to the left or right of the region of interest 410 can be ignored in many instances. In FIG. 6A, for example, the reported position 310 is slightly to the left of the taxiway 320. However, if desired, the error distributions for a reported aircraft location along any desired axis may be calculated and utilized to determine the probability that the actual position of an aircraft is within a region of interest.

Figure 6B:
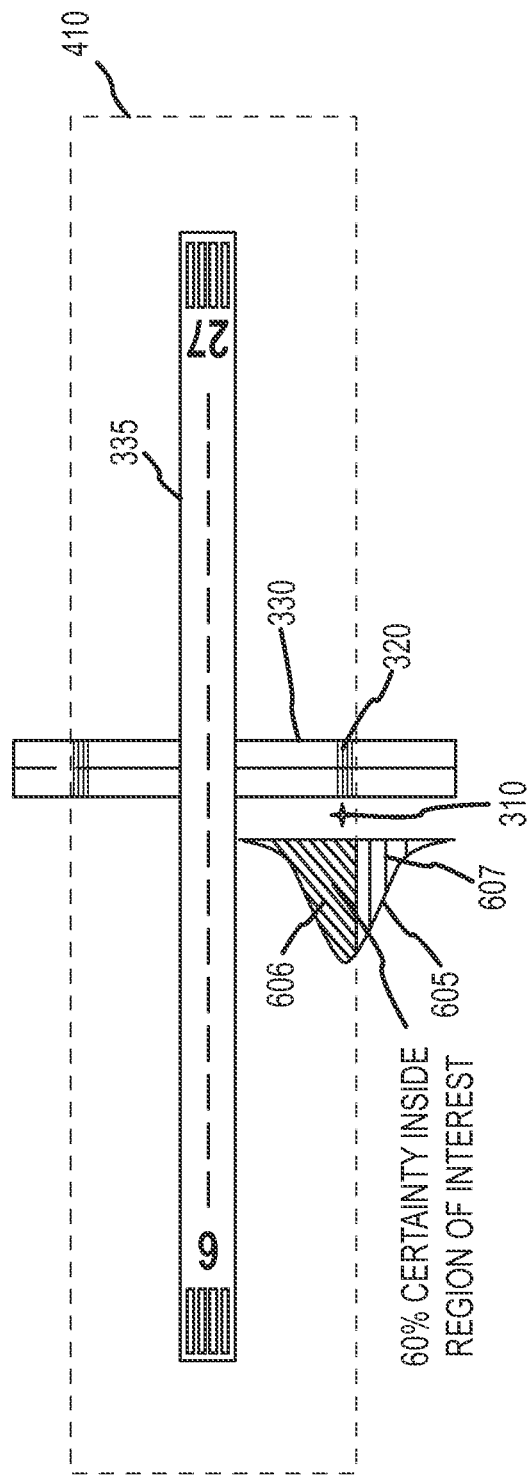

Referring now to FIG. 6B, the reported aircraft position 310 has moved from on the boundary of the region of interest 410 (as shown in FIG. 6A) to inside the region of interest 410. Based on the reported position 310 in FIG. 6B, there is now a 60% probability the aircraft is actually inside the region of interest 410 (represented by shaded portion 606 of the curve 605) and a 40% probability that the actual position is outside of the region of interest (represented by shaded portion 607 of the curve 605).

In accordance with embodiments of the present invention, a determination may be made as to whether a threat of collision between the vehicle and another object exists (230, as shown in FIG. 2). This determination can be made based on the reported position of an object and/or the probability that the actual position of the object is within another region of interest (220, as shown in FIG. 2). For example, where the reported position of a second aircraft indicates that it is occupying or utilizing the runway 335, and for an alerting system where it is desired that an alert is generated where there is at least a 60% probability that an aircraft is over the hold short line 320, it would be appropriate to issue such an alert for the reported aircraft position 310 in FIG. 6B. Embodiments of the present invention may be used to determine whether a threat of collision exists between a vehicle and any other object, such as a geographical feature, a structure, or another vehicle.

Figure 6C:
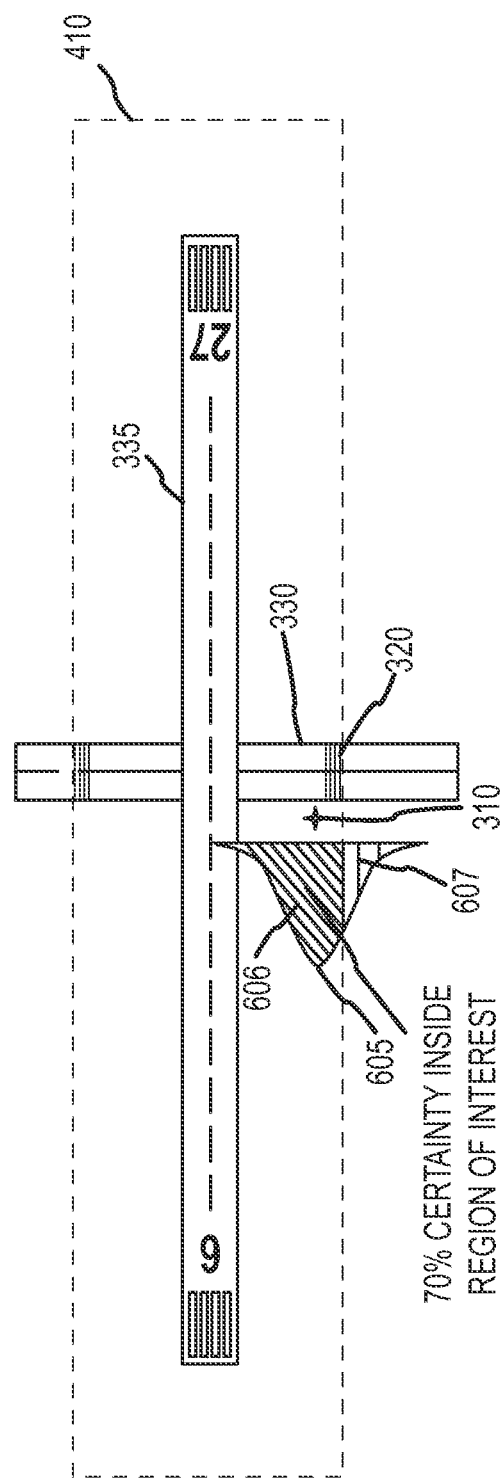
Figure 6D:
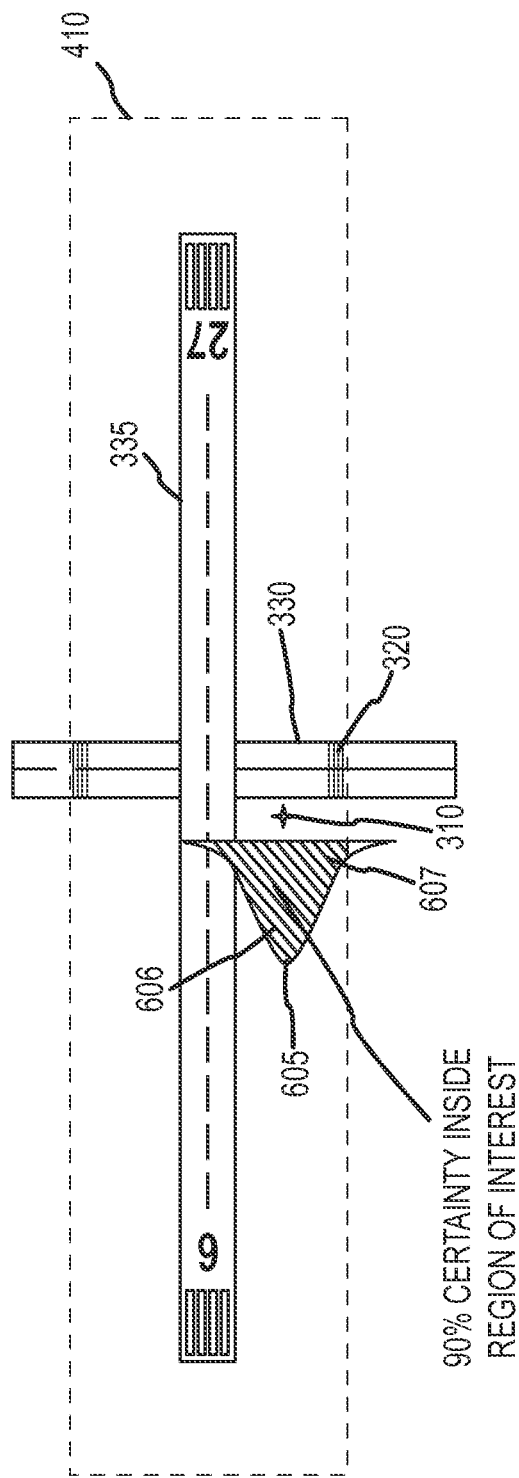
Figure 6E:
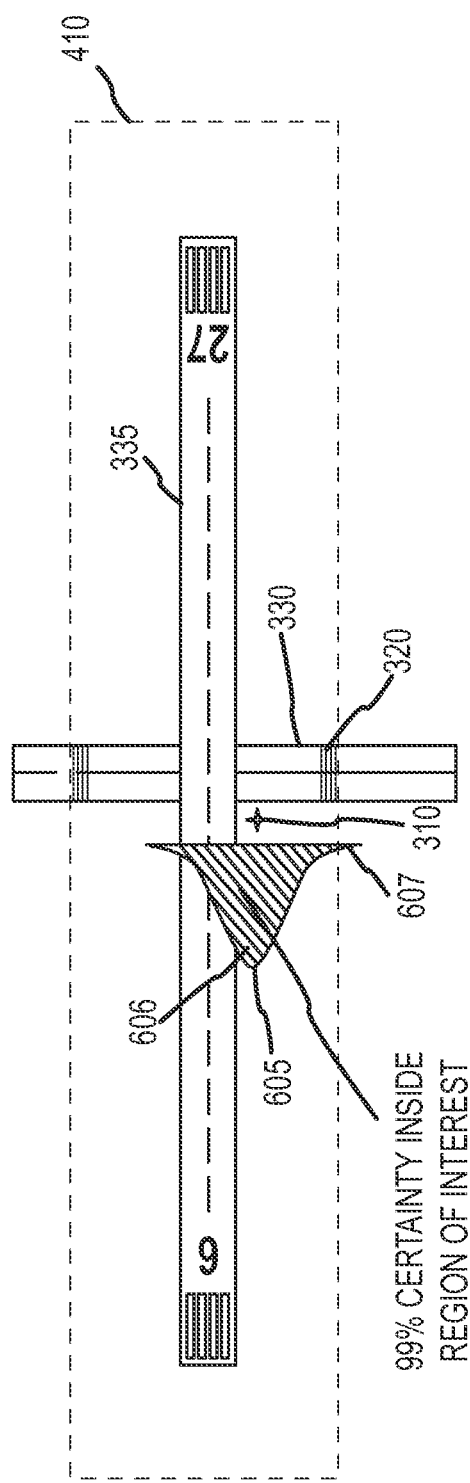

FIGS. 6C-6E illustrate how the probability the reported aircraft position 310 is within the region of interest 410 increases as the reported position 310 progresses further along the taxiway 330 and farther into the region of interest 410. In FIG. 6C, there is a 70% probability that the actual position of the aircraft is within the region of interest 410, while this probability is 90% and 99%, respectively, for the reported positions 310 in FIGS. 6D and 6E.

Embodiments of the present invention may be used to generate alerts at any desired probability level. If, for example, the requirements of a reporting system operating in conjunction with the embodiments of present invention stipulated that the system could only provide an incorrect alert once in every 100 scenarios, the reported position 310 in FIG. 6E represents the point where the reported position 310 is far enough into the region of interest 410 to have the required certainty to generate the alert and have the alert be correct 99 times out of 100. By issuing alerts when the probability that the vehicle is within a region of interest exceeds a predetermined threshold (e.g., 99.5% in FIG. 6E), unnecessary nuisance alerts can be avoided.

While the above examples do not (for the sake of simplicity) take into account other potential sources of error, any other relevant source of error may be considered and/or utilized in calculating the probability that the actual position of the aircraft is within a region of interest 410. Examples of such additional sources of error include: error in the position (or boundary measurement) of the region of interest, error in the reported velocity of the vehicle, data latency (e.g., for the reported position), and/or hardware and software errors. Additionally, the probability that a vehicle (and/or object) is within a region of interest may also be based on one or more of: a Global Positioning System Horizontal Figure of Merit (HFOM), a Global Positioning System Horizontal Integrity Limit (HIL), a Navigation Accuracy Category for Position (NAC$_p$), a Navigation Integrity Code (NIC), and a Surveillance Integrity Limit (SIL).

Figure 7:
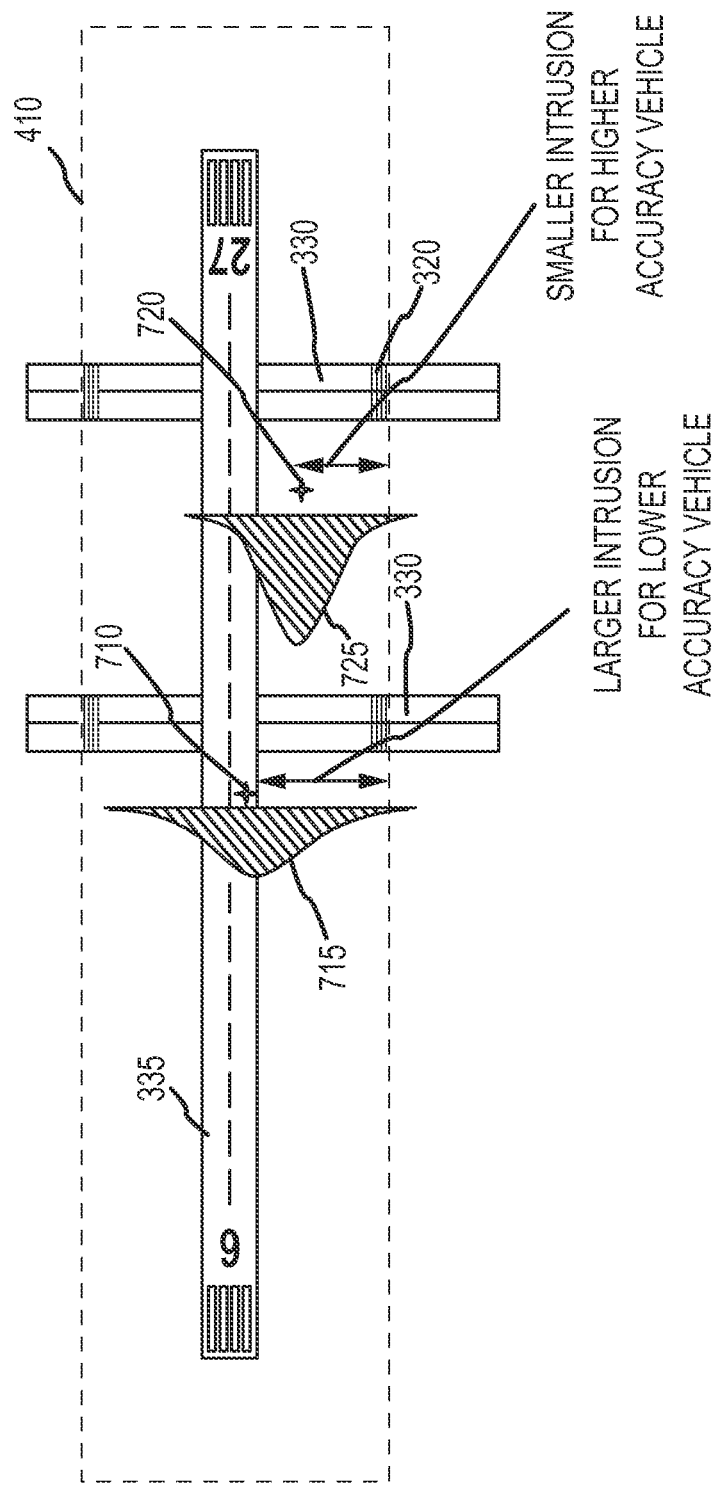
FIG. 7 illustrates accuracy levels associated with reported positions for two separate aircraft.

Systems and methods consistent with embodiments of the present invention may be used in conjunction with any number of different vehicles. FIG. 7, for example, depicts two different reported positions (710 and 720) for two different aircraft, each with a different estimated accuracy (715 and 725). The reported position 710 and position error distribution 715 has a relatively low accuracy level, while the reported position 720 and position error distribution 725 has a higher accuracy level.

Both reported positions 710 and 720 have entered into the region of interest 410 to the point where there is a 99% probability that the actual position of the respective aircraft is within the region of interest 410. The actual position of the aircraft associated with reported position 720 and error distribution 725, having a higher accuracy level, could correctly be detected as being in the region of interest 410 sooner than the aircraft associated with reported position 710 and error distribution 715.

This illustrates one of the advantages of embodiments of the present invention, namely, that an aircraft with a higher accuracy position can benefit from a higher level of protection without causing nuisance alerts to be triggered by aircraft with lower accuracy positions. Another advantage of embodiments of the present invention is that no updates (whether software or hardware) may be required to an alerting system operating in conjunction with embodiments of the present invention as navigation accuracy improves over time. Such a system would automatically generate necessary alerts sooner during an actual incursion while still not exceeding the allowable nuisance alert rate. In contrast, conventional systems that use a fixed offset (such as 50 ft) might need to be updated to a new value (such as 20 ft) at some future point in time when a given fleet of aircraft have better navigation accuracy.

Figure 8:
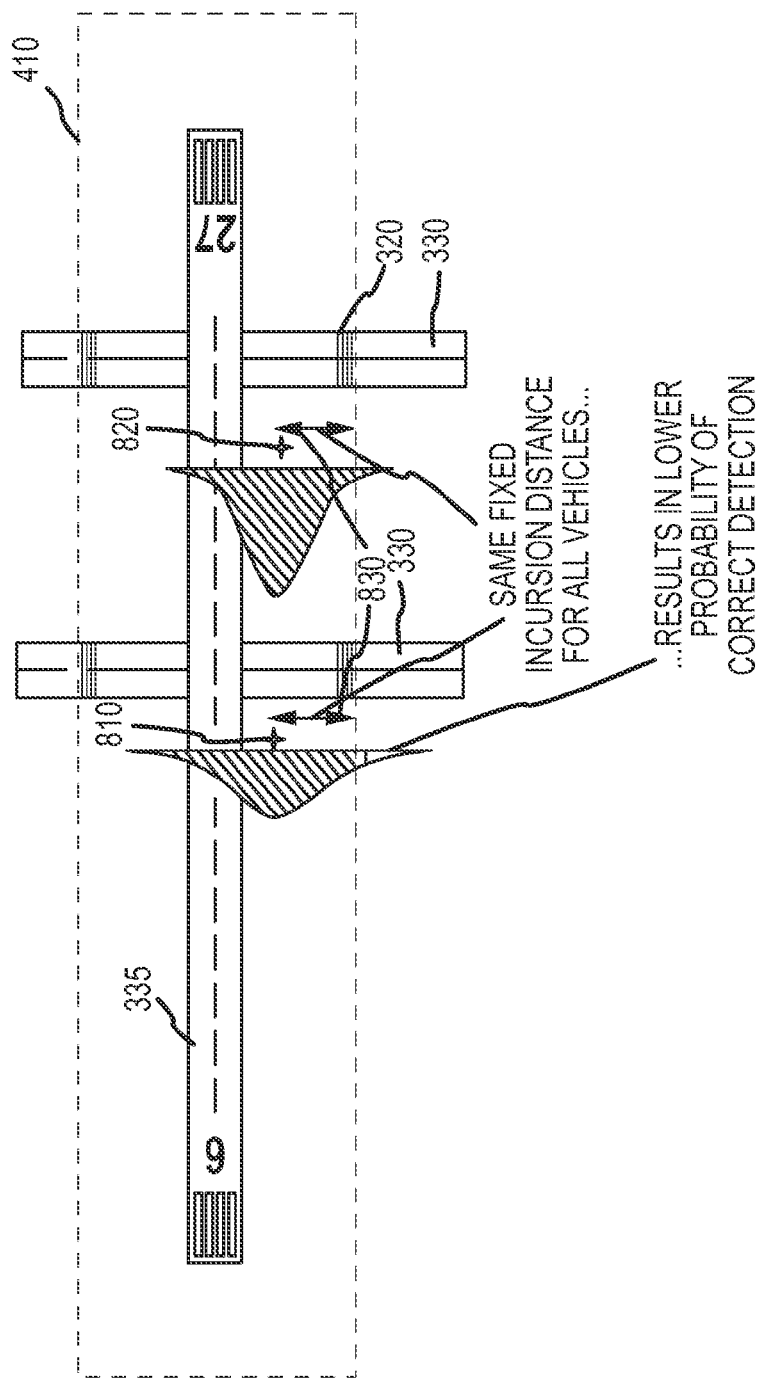
FIG. 8 depicts the use of a fixed incursion distance for two vehicles having differing levels of reported position accuracy.

FIG. 8 depicts the operation of a conventional system that might detect an incursion based on the reported position being a fixed distance 830 into a region of interest 410. In this example, while the high accuracy of the reported position 820 provides an acceptable level of certainty that the actual position is within the region of interest 410, the lower accuracy of the reported position 810 does not provide that same level of certainty. In other words, the actual position of the vehicle associated with reported position 810 is more likely to be outside of the region of interest 410, and thus any alert generated is more likely to be incorrect. In practice, conventional systems have increased the size of the required fixed distance for all aircraft in order to reduce nuisance alerts. This has the effect of unnecessarily putting an aircraft with a higher position accuracy at risk unnecessarily.

Figure 9A:
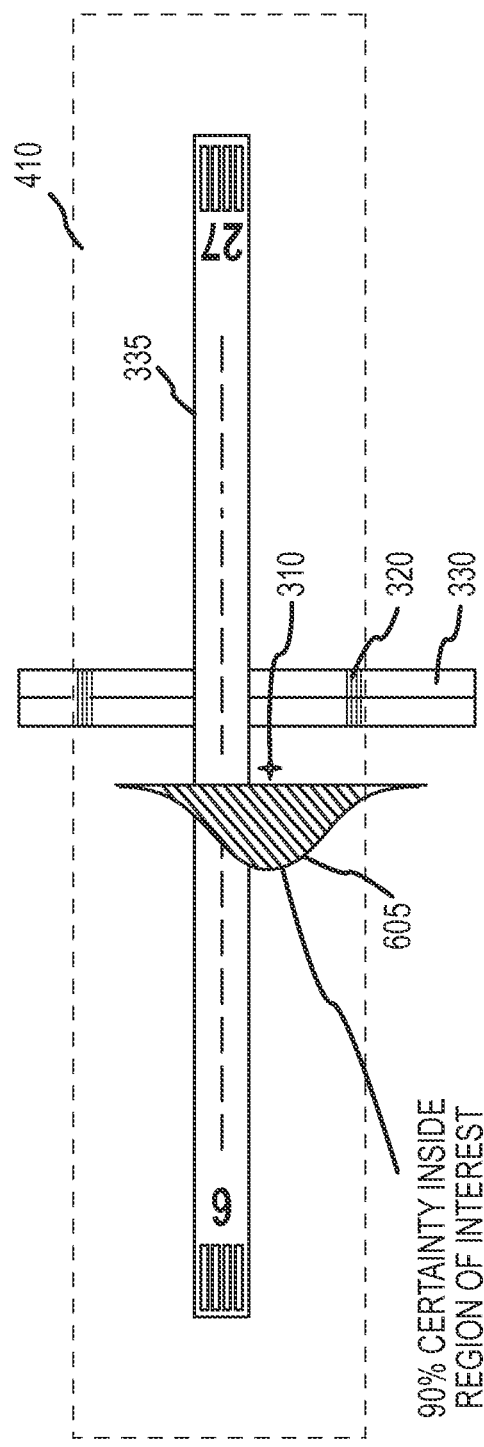
FIGS. 9A and 9B illustrate the probability the actual position of an aircraft is within a region of interest based on different reported positions of the aircraft in accordance with the present invention.

Embodiments of the present invention may operate in conjunction with reported vehicle positions having any level of accuracy. In FIG. 9A, for example, accuracy of the reported aircraft position 310 is relatively lower (as seen by the flatter error distribution curve 605) than the accuracy level of the reported position 310 in FIGS. 6A-6E. The reported position 310 in FIG. 9A represents the point where there is a 90% probability that the actual position of the aircraft is within the region of interest 410.

Figure 9B:
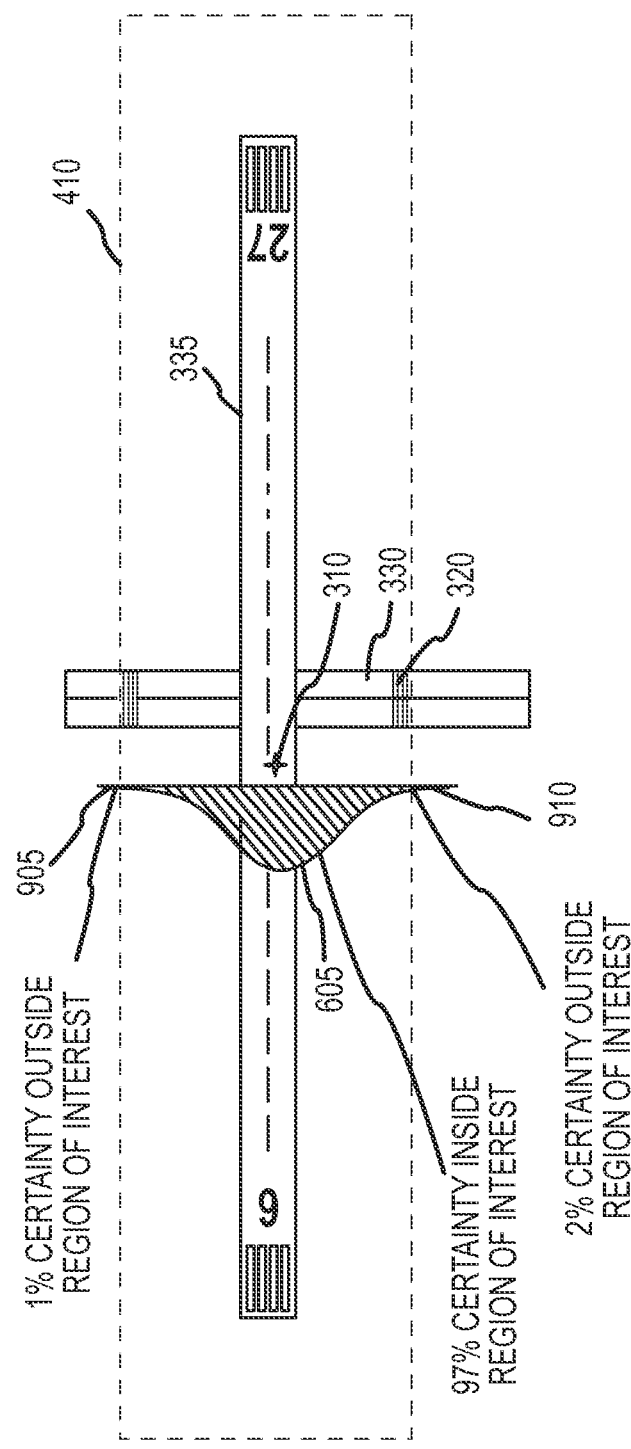

FIG. 9B shows the aircraft in FIG. 9A after it has progressed further onto the runway 335. Note that, in contrast to previous examples, the top "tail" (905) of the distribution 605 is no longer negligible. There is now a finite (1%) probability that the actual aircraft position could be above the top of the region of interest 410. Likewise, the bottom tail (910) extends below the bottom of the region of interest 410, and there is a finite (2%) probability that the actual aircraft position is below the bottom of the region of interest 410. This represents a case where the accuracy of the reported position is insufficient to allow a determination to be made that the aircraft is within the region of interest 410 to a certainty of 99%, using reported position information alone. In such cases, the present invention may utilize other factors, such as reported aircraft velocity or reported aircraft heading, to help ascertain whether the aircraft is on the runway or not.

Systems and methods consistent with embodiments of the present invention may utilize information regarding geographical features to help determine the probability that the actual position of a vehicle or other object is within a region of interest. In this context, a "geographical feature" refers to any man-made or natural feature. Information regarding geographical features, as with other information utilized by embodiments of the present invention, may be stored by systems and devices acting in accordance with embodiments of the present invention and/or may be provided from any suitable data source. In one exemplary embodiment of the present invention, the geographical features of (and surrounding) an airport (e.g., runways, hold short lines, terminals, structures, and undeveloped land) can be correlated with a reported position to verify that the reported position for the aircraft is on valid terrain, such as a runway, taxiway, ramp, gate, or other valid airport surface. If the reported position puts the aircraft on an invalid surface (such as in a swamp next to the airport), the position can be re-evaluated to determine a valid position for the aircraft, and the probability that the aircraft is within a region of interest modified accordingly.

Embodiments of the present invention may consider, in determining whether a threat of collision exists (230) between a vehicle and another object, the reported velocity of the vehicle and/or object, as well as an estimation of accuracy for such reported velocities. Additionally, embodiments of the present invention may base the determination as to whether a threat of collision exists between a vehicle and object on, among other things, the distance between the vehicle and/or object and the point of closest approach between the two, as well as an estimated time until the vehicle and/or object are expected to reach the point of closest approach.

Just as a reported position of a vehicle may be used to calculate a probability that the actual position of the vehicle is within a region of interest, a probability that the actual position of another object (such as a second vehicle) is within another (or the same) region of interest can be calculated based on the reported position of the object. Both probabilities can then be used in determining whether a threat of collision exists between the aircraft and the object. For example, where it is determined (as described above for FIG. 6E) that there is a 99.5% probability that an aircraft on the taxiway 330 is past the hold short line 320, and where it is likewise determined that, based on another region of interest (not shown), there is a 99.5% probability that a second aircraft is on (or about to land on) the runway 335, a system configured to provide an incorrect alert once in every 100 scenarios would issue an alert that a collision threat exists. As with the region of interest 410 described above, a second region of interest may likewise be of any size, shape, and configuration. Any number of regions of interest may be used in conjunction with embodiments of the present invention, and multiple regions of interest may be separate, or may overlap, as desired.

If it is determined that a threat of collision exists between a vehicle and an object, any form of alert can be issued to any desired entity. For example, the alert may include a visual and/or audible alert issued to an operator of the vehicle, and/or an individual external to the vehicle (such as an air traffic controller). Embodiments of the present invention can reduce nuisance alerts by delaying the alert until a higher level of certainty that a relevant alerting condition is reached, for instance 99.999%. This would result in a nuisance alert in only 1 out of 100,000 runway operations, which might be only once in a professional pilot's entire career. The reduction of nuisance alerts by embodiments of the present invention renders alert systems more trustworthy. By contrast, where a pilot has been fooled by a conventional alerting system that "cries wolf" too often, he or she will be less likely to react quickly on that very rare occurrence when a runway incursion does in fact occur and the system generates a valid alert.

Consider the following discussion of a hypothetical alerting system consistent with embodiments of the present invention.

Assume the operationally acceptable rate of nuisance alerts is 1 nuisance alert per 10,000 operations, where an operation is defined as a takeoff or a landing. Further, assume that analysis has shown that on average, 10 aircraft are operating near (but not on) a runway as ownship either takes off or lands. Since there can be a 1 in 10,000 chance of a nuisance alert, and a nuisance alert can be caused by an error in position of any of the other 10 aircraft, it follows that any one aircraft can cause a nuisance alert in 1 out of 100,000 operations. Note that for clarity this simplified description ignores other sources of nuisance alerts which may exist, and that such other sources of nuisance alerts may be included in other embodiments of the present invention.

Depending on the system design, this $1/100,000$ exemplary requirement may force one alerting system to ignore traffic with accuracy less than a specific threshold (such as a $NAC_p$ less than 9) and may force another system to delay alerting until an aircraft is farther out onto the runway (such as 4.3 sigma beyond the hold line).

Embodiments of the present invention may include systems and methods with dynamic alert thresholds that could take into account the quantity of aircraft in the vicinity of ownship's runway at any one time or even over the course of time and adjust the alert boundaries accordingly.

For instance, while on approach to a runway with only one additional aircraft in the vicinity, the entire $1/10,000$ nuisance risk could be allocated to that single aircraft and an alert could be generated when it was 3.75 sigma beyond the hold line. Even more dramatically, in a system that would otherwise have ignored an aircraft with a specific position accuracy (such as $NAC_p=9$), a dynamic allocation of nuisance allowance could result in a valid alert being generated for that aircraft in a given scenario.

Other variations are envisioned. For instance, a "learning" function could be implemented to adjust the alerting thresholds over an extended period of time based on the traffic volume experienced over multiple operations.

Moreover, the nuisance threshold ($1/10,000$ or 1 alert per 10,000 events) is understood to be exemplary. Embodiments of the present invention may utilize any nuisance threshold that is desired. Additionally, embodiments of the present invention may select for use from a plurality of different nuisance thresholds, each set to an appropriate value based on a particular set of circumstances. In other words, based on the circumstances, systems and methods consistent with embodiments of the present invention may select an appropriate nuisance threshold, which is to say a nuisance threshold that has been set based on a set of conditions that are now or are perceived to be present in the future for the host vehicle, and are therefore, now relevant.

Figure 10:
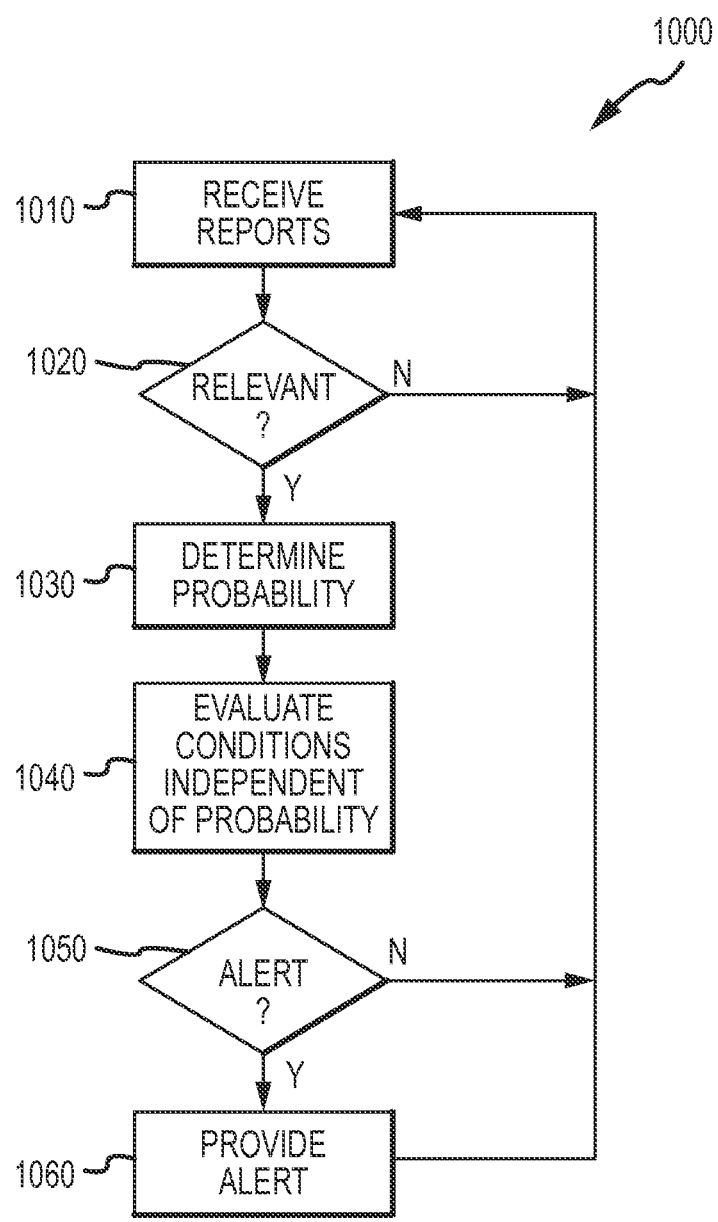
FIG. 10 is a flow diagram of an exemplary process according to various aspects of the present invention.

FIG. 10 shows a process 1000 consistent with embodiments of the present invention that may utilize dynamic thresholds for conflict detection. As those skilled in the art will appreciate, any previously-described system or method consistent with embodiments of the present invention may be employed with process 1000.

In process 1010, a hosting aircraft may receive reports from other aircraft or vehicles. For the sake of clarity, while the description set forth herein generally pertains to aircraft, those skilled in the art will understand that embodiments of the present invention may be applied outside of the avionics product space. Moreover, in the context of the avionics product space, the collision avoidance concepts described herein may be utilized to detect and prevent collisions between two or more vehicles (wherein a vehicle may comprise not only an aircraft but any vehicle that may be found in an airport), between a vehicle and any other object, between a vehicle and a person or indeed between any two or more objects.

In process 1010, a host vehicle (such as an aircraft) may receive one or more reports from one or more other vehicles (such as aircraft). In an exemplary embodiment of the present invention, these reports may comprise ADS-B reports from a vehicle. Such reports typically include, among other things, an aircraft identifier, as well as a position, a speed, a heading and a $NAC_p$ for the reported position. Embodiments of the present invention may employ such information for any of the collision detection and avoidance techniques described herein. Those skilled in the art will understand, however, that embodiments of the present invention may employ any other additional information (such as aircraft intent, vehicle length and width codes, vehicle category, position integrity, velocity accuracy, etc.) that may be made available from an ADS-B report or any other source of information that may be made available to aircraft.

Those skilled in the art will also understand that such reports may be provided through any means that an aircraft may receive such information. For example, an alternate means may include a TIS-B (Traffic Information Services Broadcast) report. TIS-B supplements ADS-B air-to-air services to provide more complete situational awareness in the cockpit of most if not all traffic known to the ATC system. TIS-B is a service for an ADS-B link in airspace where not all aircraft are transmitting ADS-B information. The ground TIS-B station transmits surveillance target information on the ADS-B data link for unequipped targets.

Like TIS-B, ADS-R (Automatic Dependant Surveillance-Rebroadcast) may provide reports that may be employed with embodiments consistent with the present invention. ADS-R accommodates the dual link nature of ADS-B, which broadcasts on both 1090 MHz-for air transport, military and high-end general aviation aircraft- and the Universal Access Transceiver (UAT)-for lower cost airborne avionics on aircraft flying below 24,000 feet. ADS-R will translate all 1090 MHz messages and re-transmit them in UAT format, and vice versa. Therefore, ADS-R assures that UAT and 1090 MHz aircraft will see each other.

In process 1020 a determination may be made as to the relevance of any received report. In other words, the host aircraft may receive reports from a number of aircraft that are, for one reason or another, not relevant to the host aircraft in a determination as to whether a risk of collision exists. As those skilled in the art realize, there may be a number of different means for determining the relevancy of one aircraft to another in a collision avoidance determination.

For example, a database on or accessible to the host aircraft may include data representing various points of airport geography, such as the runways, taxiways, and gates (to name a few). Using an item of retrieved airport geography, such as a runway, one can build an area for the relevancy determination. Depending on the circumstances and one's needs, the retrieved item of airport geography may be expanded or retracted along any dimension of the item of airport geography. For example, if the retrieved item of airport geography was an airport runway, one might wish to adjust the area around the airport runway to include not only the runway but also the various hold short lines adjacent to the runway, as well as perhaps an additional buffer beyond one or more of the hold short lines. Again, as one skilled in the art will understand, there are numerous various different ways of establishing an area from which the relevancy determination may be made. Importantly, any of these various different ways may be employed with embodiments of the present invention.

Still referring to process 1020, once an appropriate area is identified for the relevancy determination, the received reports from the various vehicles may be compared with the identified area to determine whether the vehicles are inside the relevancy-determination area, and therefore are relevant, or outside of the relevancy-determination area, and thus irrelevant. As indicated in FIG. 10, the occurrence of irrelevant vehicles may pass process 1020 to process 1010 to continue receiving reports and returning to process 1020 for the relevancy determination. Aircraft that are identified as relevant in process 1020 pass to process 1030 for determining position probability for the relevant aircraft.

In process 1030, position probabilities may be determined for the various reporting vehicles. For example, referring to FIG. 11, an image is shown of a portion of airport geography. Specifically, a runway is shown having a pair of taxiways crossing the runway. Concerning the taxiway on the left, one can see that the aircraft has a reported position that is over the hold short line, while in this example, the aircraft is only slightly over the hold short line. In contrast, concerning the taxiway to the right, the actual position of the aircraft is behind the hold short line, while the reported position for this aircraft is coinciding with the hold short line but slightly to the right of the taxiway, as shown.

Figure 11:
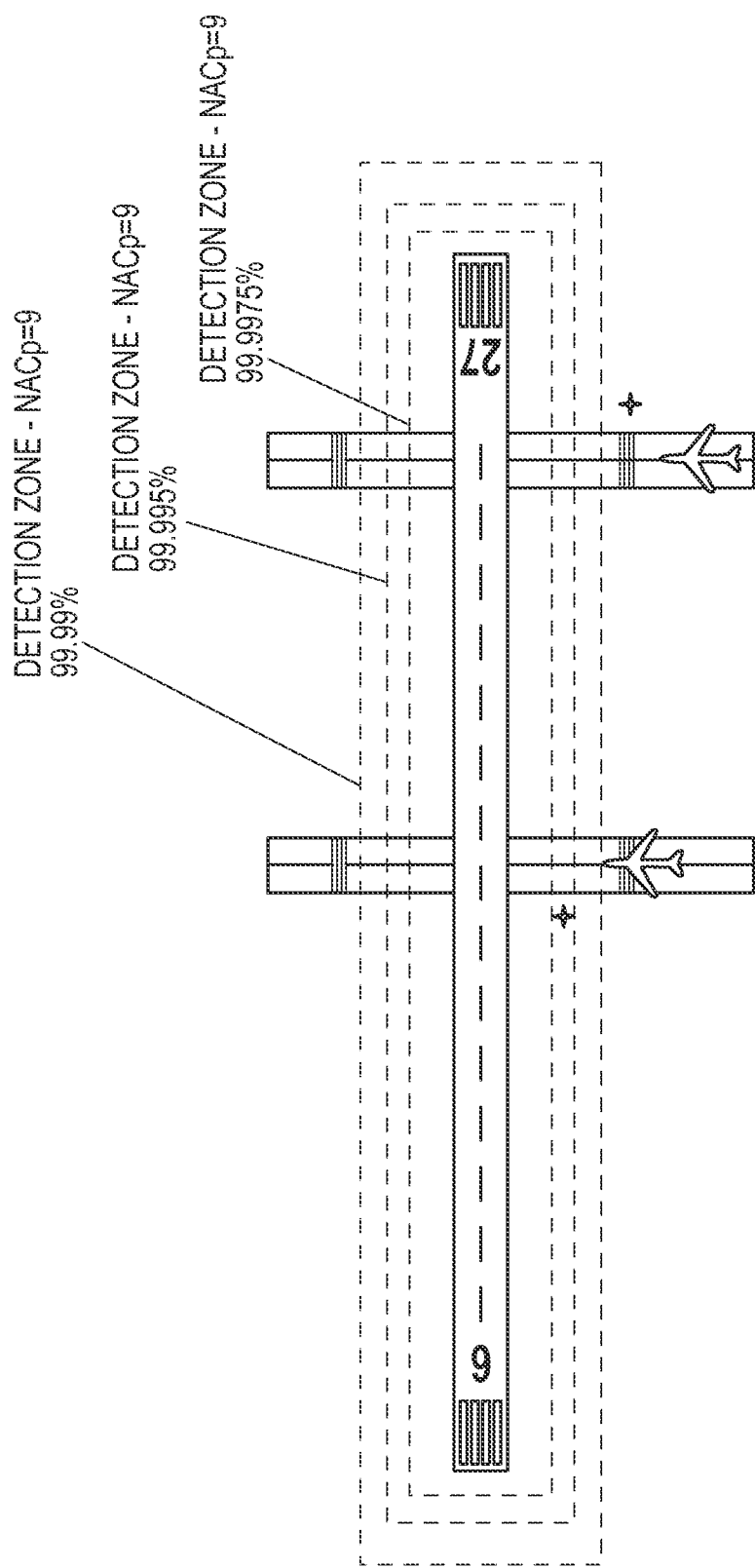
FIG. 11 is a plan view of a portion of airport geography, depicting a scenario for describing an exemplary embodiment of the present invention.

Regarding FIG. 11 and the table below, a way to determine the probability that two independent events will both occur is to multiply the probabilities that each one will happen individually. For instance, if the probability that aircraft 1 (on the left taxiway in FIG. 11) is in the shaded region (over the hold short line) is 0.9996 (99.96%) and the probability that aircraft 2 (on the right taxiway in FIG. 11) is in the shaded region is 0.50 (50%), then the probability that they are both in the shaded region is 0.9996*0.50=0.4998. In real terms, this is the probability that both aircraft have crossed the hold short line into the shaded region in FIG. 11.

Similarly, the probability that both aircraft are in the unshaded region (behind the hold short line) is 0.0004*0.50=0.0002. This is the probability that neither aircraft has crossed the hold short line. To find the probability that at least one aircraft is in a given region, you calculate the probability that all the aircraft are in the other region and subtract that from 1.00 (100%). For instance, the probability that at least one aircraft has crossed the hold short line is 1.000−0.0002=0.9998.

|  | Shaded (Region 1) | Unshaded Region (Region 2) |
|---|---|---|
| Probability that Aircraft 1 is in the region | 0.9996 | 0.0004 |
| Probability that Aircraft 2 is in the region | .50 | .50 |
| "Product" of probabilities - i.e. probability that both aircraft are in the region | .49998 | 0.0002 |
| Probability that at least one aircraft is in the region (100% minus the probability that both aircraft are in opposite region). | 0.99998 | 0.50002 |

Thus, if one is able to establish that the probability is relatively low for all relevant aircraft being behind their respective hold short lines (and below or equal to a properly set nuisance-avoiding threshold), one can reasonably conclude that conditions for providing an appropriate (non-nuisance) alert have been met. Similarly, if one is able to establish that the probability is relatively high for at least one relevant aircraft being over its respective hold short line (and above or equal to a properly set nuisance-avoiding threshold), one can reasonably conclude that conditions for providing an appropriate (non-nuisance) alert have been met.

As those skilled in the art will appreciate, it is possible to attain the above-cited conditions for which it is reasonable to issue an appropriate alerts where there is no real risk of collision. For example, when an aircraft has been cleared for takeoff, the next aircraft may be cleared to "line up and wait", meaning air traffic control allows the aircraft to taxi across the hold line and on to the runway but not to take off yet. During that time, the first aircraft is accelerating down the runway for takeoff, but since the first aircraft is moving away from the second aircraft there is no threat of collision and no alert is required or appropriate even though there are two aircraft on the runway simultaneously. Many other such safe scenarios with multiple aircraft on a runway simultaneously routinely occur at airports. Accordingly, in addition to testing for the above-cited conditions, it must be independently established that there is some real risk of collision before a proper alert may be issued.

In process 1040, independent of the determination of probabilities noted above with respect to process 1030, process 1040 may utilize information from the provided reports to establish an understanding of conditions surrounding the host vehicle, such as whether the conditions surrounding the host vehicle suggest a real potential for collision. Those skilled in the art will understand that a variety of different criteria may be considered in such a determination, any of which may be utilized by embodiments of the present invention. For example, if two aircraft are on the same runway with an opening range rate (i.e., the range is opening between them), there is no practical reason to conclude that a real risk of collision exists. Alternatively, two aircraft on the same runway with a closing range rate presents a situation with real risk of collision in which an alert may be provided, assuming the additional above-identified criteria from process 1030 are met.

As another example, a small aircraft that is safely decelerating on a runway with another aircraft on the runway 7000 ft in front of the first aircraft would not present a collision risk. Similarly, cases where "Land and Hold Short Operations" (LAHSO) are in effect could have aircraft landing simultaneously on intersecting runways without undue risk and therefore not needing an alert.

In process 1050, a determination is made based on the evaluation in process 1040 as to whether (1) a threat of collision is to determined to exist between the host vehicle and at least one other vehicle and (2) one or more of the above-identified criteria from process 1030 are met. Assuming that these conditions are met an alert is provided at that process 1060, and process 1000 returns to run again. Similarly, if process 1050 determines that no alert should be provided, process 1000 returns to the beginning to run again.

The particular implementations shown and described above are illustrative of embodiments of the present invention and its best mode and are not intended to otherwise limit the scope of the present invention in any way. Indeed, for the sake of brevity, conventional data storage, data transmission, and other functional aspects of the systems may not be described in detail. Methods illustrated in the various figures may include more, fewer, or other steps. Additionally, steps may be performed in any suitable order without departing from the scope of the present invention. Furthermore, the connecting lines shown in the various figures are intended to represent exemplary functional relationships and/or physical couplings between the various elements. Many alternative or additional functional relationships or physical connections may be present in a practical system.

Changes and modifications may be made to the disclosed embodiments without departing from the scope of the present invention. These and other changes or modifications are intended to be included within the scope of the present invention, as expressed in the following claims.

What is claimed is:
1. A method comprising:
receiving, in avionics hardware, in a host vehicle one or more reports from one or more other vehicles, the one or more reports each including a reported position for a respective one of the one or more other vehicles;
for each of the one or more other vehicles, comparing, by the avionics hardware, a respective probability distribution that is based on information provided in a respective report to a respective representation of a line of demarcation, each respective representation of a line of demarcation dividing a respective first region from a respective second region wherein each respective first region includes a respective zone of interest;
for each of the one or more other vehicles, determining, by the avionics hardware, from the respective probability distribution a respective probability that a respective one of the one or more other vehicles is located in a respective second region;
determining, by the avionics hardware, whether a probability that all of the one or more vehicles are located in a respective second region is less than or equal to a predefined value; and
providing, by the avionics hardware, an alert in the host vehicle when:
(1) a threat of a collision is determined to exist between the host vehicle and at least one of the one or more other vehicles; and

(2) the probability that all of the one or more vehicles are located in a respective second region is less than or equal to the predefined value.

2. The method of claim 1 further comprising evaluating the one or more reports from the one or more other vehicles to determine which, if any, of the one or more other vehicles are relevant for purposes of determining whether to provide the alert.

3. The method of claim 2 wherein the only vehicles that are considered in determining whether to provide the alert are those vehicles that are determined to be relevant for purposes of providing the alert.

4. The method of claim 2 wherein the determination of whether the one or more other vehicles are relevant is based upon determining whether the one or more other vehicles are reported as being located within an area bounded by an item of airport geography whose perimeter may be selectively expanded or retracted by one or more adjustment values along one or more segments of the item of airport geography.

5. The method of claim 4 wherein the one or more adjustment values may comprise any numbers.

6. The method of claim 4 wherein the item of airport geography comprises one or more of a runway and a taxiway.

7. The method of claim 1 wherein each respective probability distribution comprises a respective Gaussian distribution.

8. The method of claim 1 wherein the information comprises one or more values of $NAC_p$.

9. The method of claim 1 wherein the one or more respective lines of demarcation comprise one or more respective hold short lines.

10. The method of claim 1 wherein the one or more respective zones of interest comprise one or more of at least a portion of a respective runway and at least a portion of a respective taxiway.

11. The method of claim 1 further comprising selecting the predetermined value from a plurality of predetermined values wherein each predetermined value is established based upon a predefined set of circumstances.

12. The method of claim 1 further comprising:
for each of the one or more vehicles, determining, based on the information provided in a respective report, a risk assessment for the respective vehicle; and
applying a respective determined risk assessment weight factor in determining the respective probability for the respective vehicle.

13. A method comprising:
receiving, in hardware in a host system, a report from a vehicle, the report comprising a reported position of the vehicle;
comparing, by the hardware, a probability distribution that is based on information provided in the report to a representation of a line of demarcation dividing a first region from a second region wherein the first region includes a zone of interest;
determining, by the hardware, from the probability distribution a probability that the vehicle is located in a respective second region;
determining, by the hardware, whether the probability that the vehicle is located in the second region is less than or equal to a predefined value; and
providing, by the hardware, an alert in the host system based on determining that both following conditions are met:
(1) a threat of a collision is determined to exist between the host system and the vehicle; and
(2) the probability that the vehicle is located in the second region is less than or equal to the predefined value.

14. The method of claim 13, wherein the host system comprises an aircraft.

15. The method of claim 13, wherein the first region is configured to correspond to an area around a particular runway.

16. The method of claim 13, wherein a boundary of the first region corresponds to a hold short line adjacent to a runway.

17. A method comprising:
receiving, in hardware in a host system, a report from a vehicle, the report comprising a reported position of the vehicle;
comparing, by the hardware, a probability distribution that is based on information provided in the report to a representation of a line of demarcation dividing a first region from a second region wherein the first region includes a zone of interest;
determining, by the hardware, from the probability distribution a probability that the vehicle is located in a respective second region;
determining, by the hardware, whether the probability that the vehicle is located in the second region is less than or equal to a predefined value; and
providing, by the hardware, an alert in the host system based on determining that at least one of the following conditions is met:
(1) a threat of a collision is determined to exist between the host system and the vehicle; and
(2) the probability that the vehicle is located in the second region is less than or equal to the predefined value.

18. The method of claim 17, wherein the host system comprises an aircraft.

19. The method of claim 17, wherein the first region is configured to correspond to an area around a particular runway.

20. The method of claim 17, wherein a boundary of the first region corresponds to a hold short line adjacent to a runway.

* * * * *